(12) United States Patent
Zou

(10) Patent No.: US 11,867,998 B2
(45) Date of Patent: Jan. 9, 2024

(54) LIQUID CRYSTAL DISPLAY PANEL AND LIQUID CRYSTAL DISPLAY DEVICE

(71) Applicant: TCL CHINA STAR OPTOELECTRONICS TECHNOLOGY CO., LTD., Shenzhen (CN)

(72) Inventor: Xiaoling Zou, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 179 days.

(21) Appl. No.: 17/440,627

(22) PCT Filed: May 31, 2021

(86) PCT No.: PCT/CN2021/097440
§ 371 (c)(1),
(2) Date: Sep. 17, 2021

(87) PCT Pub. No.: WO2022/151638
PCT Pub. Date: Jul. 21, 2022

(65) Prior Publication Data
US 2023/0100095 A1 Mar. 30, 2023

(30) Foreign Application Priority Data
Jan. 15, 2021 (CN) .......................... 202110055254.3

(51) Int. Cl.
*G02F 1/1335* (2006.01)
(52) U.S. Cl.
CPC .. *G02F 1/133512* (2013.01); *G02F 1/133514* (2013.01); *G02F 1/133531* (2021.01)

(58) Field of Classification Search
CPC ... G02F 1/133514; G02F 2001/136222; G02F 1/133512; G02F 1/133509; H01L 29/78633; H01L 51/5284
See application file for complete search history.

(56) References Cited

U.S. PATENT DOCUMENTS 5,566,011 A 10/1996 Steigerwald
2004/0027514 A1 2/2004 Kobayashi
(Continued)

FOREIGN PATENT DOCUMENTS

CN 101526685 A 9/2009
CN 101581852 A 11/2009
(Continued)

OTHER PUBLICATIONS

International Search Report in International application No. PCT/CN2021/097440, dated Oct. 14, 2021.
(Continued)

*Primary Examiner* — Jonathan Y Jung
(74) *Attorney, Agent, or Firm* — PV IP PC; Wei Te Chung; Zhigang Ma

(57) ABSTRACT

The present application provides a liquid crystal display panel and a liquid crystal display device. In the liquid crystal display panel, a light-shielding pattern is disposed on a side of a first substrate away from a liquid crystal layer, and the light-shielding pattern is disposed between two adjacent pixels. A difference between a width of the light-shielding pattern and a distance between the two adjacent pixels is less than or equal to a threshold value. A material of the light-shielding pattern includes an inorganic material. Therefore, an aperture ratio of the liquid crystal display panel is increased.

14 Claims, 5 Drawing Sheets

(56) References Cited

U.S. PATENT DOCUMENTS

| | | | |
|---|---|---|---|
| 2013/0201429 A1* | 8/2013 | Xu | G02F 1/1368 349/95 |
| 2015/0362794 A1* | 12/2015 | Pang | G02F 1/136204 359/885 |
| 2016/0306210 A1* | 10/2016 | Oh | G02F 1/13394 |
| 2017/0322446 A1* | 11/2017 | Tae | G02F 1/136286 |
| 2019/0384096 A1* | 12/2019 | Que | G02F 1/133514 |
| 2020/0278579 A1* | 9/2020 | Ma | G02F 1/133512 |

FOREIGN PATENT DOCUMENTS

| | | |
|---|---|---|
| CN | 104020603 A | 9/2014 |
| CN | 106200104 A | 12/2016 |
| CN | 106707608 A | 5/2017 |
| CN | 108153071 A | 6/2018 |
| CN | 110058447 A | 7/2019 |
| CN | 110673382 A | 1/2020 |
| CN | 210465920 U | 5/2020 |
| CN | 112764259 A | 5/2021 |
| CN | 112764260 A | 5/2021 |

OTHER PUBLICATIONS

Written Opinion of the International Search Authority in International application No. PCT/CN2021/097440,dated Oct. 14, 2021.
Chinese Office Action issued in corresponding Chinese Patent Application No. 202110055254.3 dated Apr. 27, 2023, pp. 1-7.

* cited by examiner

LIQUID CRYSTAL DISPLAY PANEL AND LIQUID CRYSTAL DISPLAY DEVICE

RELATED APPLICATIONS

This application is a Notional Phase of PCT Patent Application No. PCT/CN2021/097440 having international filing date of May 31, 2021, which claims the benefit of priority of Chinese Patent Application No. 202110055254.3 filed on Jan. 15, 2021. The contents of the above applications are all incorporated by reference as if fully set forth herein in their entirety.

FIELD OF INVENTION

The present application is related to the field of display technology and specifically to a liquid crystal display panel and a liquid crystal display device.

BACKGROUND OF INVENTION

A current liquid crystal display device adopts a polarizer, color resists, and a liquid crystal modulation to display different gray scales and colors. A liquid crystal display panel is composed of a plurality of pixels and is driven by cross-addressing in horizontal and vertical directions. Because there are wires between two adjacent pixels, liquid crystals in a region between the two adjacent pixels cannot be effectively controlled. Therefore, in prior art, the black matrix is configured to shield regions adjacent to the pixels. However, in order to prevent scattering of stray light, a width of the black matrix is greater than an actual width that needs to be shielded, resulting in a lower aperture ratio of the liquid crystal display panel.

Therefore, the current liquid crystal display device has a technical problem that the width of the black matrix is relatively large, which reduces an aperture ratio of the liquid crystal display panel.

SUMMARY OF INVENTION

The present application provides a liquid crystal display panel and a liquid crystal display device to solve a technical problem in a current liquid crystal display device that a width of a black matrix is relatively large, which reduces an aperture ratio of the liquid crystal display panel.

In order to solve the above problem, technical solutions provided by the present application are as follows.

The present application provides a liquid crystal display panel. The liquid crystal display panel includes:
  a first substrate;
  a second substrate disposed opposite to the first substrate; and
  a liquid crystal layer disposed between the first substrate and the second substrate.

A light-shielding layer is disposed on a side of the first substrate away from the liquid crystal layer. The light-shielding layer is patterned to form a light-shielding pattern. The light-shielding pattern is disposed between two adjacent pixels. A difference between a width of the light-shielding pattern and a distance between the two adjacent pixels is less than or equal to a threshold value. A material of the light-shielding pattern includes an inorganic material.

In an embodiment, the first substrate includes an array substrate, the array substrate includes a first base and a driving circuit layer disposed on the first base, and the light-shielding pattern is disposed on a side of the first base away from the driving circuit layer.

In an embodiment, the first substrate includes a color filter substrate, the color filter substrate includes a second base and a color resist layer disposed on the second base, two adjacent color resists are arranged at intervals, and the light-shielding pattern is disposed on a side of the second base away from the color resist layer.

In an embodiment, the light-shielding pattern includes a first pattern arranged horizontally and a second pattern arranged vertically, a width of the first pattern is equal to a distance between the two adjacent color resists arranged horizontally, and a width of the second pattern is equal to a distance between the two adjacent color resists arranged vertically.

In an embodiment, a material of the light-shielding pattern includes one of copper, aluminum, silver, zinc, a copper-zinc laminate, a copper-titanium laminate, or a copper-aluminum laminate.

In an embodiment, the liquid crystal display panel further includes a planarization layer, the planarization layer is arranged in a region corresponding to the color resists, and the planarization layer is disposed in gaps formed by the light-shielding pattern.

In an embodiment, a material of the planarization layer includes one of silicon nitride, silicon oxide, or silicon oxynitride.

In an embodiment, the first substrate includes a third base, a driving circuit layer, and a color resist layer, two adjacent color resists are overlapping with each other, and the light-shielding pattern is disposed on a side of the third base away from the driving circuit layer.

In an embodiment, the liquid crystal display panel further includes a terminal region, and the light-shielding region is arranged along a direction perpendicular to the terminal region and is positioned in a region opposite to the terminal region.

In an embodiment, the liquid crystal display panel further includes a terminal region, and the light-shielding region is arranged along the terminal region and is positioned in a region opposite to the terminal region.

Meanwhile, the present application provides a liquid crystal display device. The liquid crystal display device includes:
  a liquid crystal display panel including a first substrate, a second substrate, and a liquid crystal layer, wherein the second substrate is disposed opposite to the first substrate, the liquid crystal layer is disposed between the first substrate and the second substrate, a light-shielding layer is disposed on a side of the first substrate away from the liquid crystal layer, the light-shielding layer is patterned to form a light-shielding pattern, the light-shielding pattern is disposed between two adjacent pixels, a difference between a width of the light-shielding pattern and a distance between the two adjacent pixels is less than or equal to a threshold value, and a material of the light-shielding pattern includes an inorganic material; and
  a polarizer disposed on the liquid crystal display panel.

In an embodiment, the polarizer includes a first polarizer and a second polarizer, the first polarizer is close to the first substrate, the second polarizer is close to the second substrate, and at least one of the light-shielding pattern is disposed between the first polarizer and the first substrate and is disposed between the second polarizer and the second substrate.

In an embodiment, the first substrate includes an array substrate, the array substrate includes a first base and a driving circuit layer disposed on the first base, and the light-shielding pattern is disposed on a side of the first base away from the driving circuit layer.

In an embodiment, the first substrate includes a color filter substrate, the color filter substrate includes a second base and a color resist layer disposed on the second base, two adjacent color resists are arranged at intervals, and the light-shielding pattern is disposed on a side of the second base away from the color resist layer.

In an embodiment, the light-shielding pattern includes a first pattern arranged horizontally and a second pattern arranged vertically, a width of the first pattern is equal to a distance between the two adjacent color resists arranged horizontally, and a width of the second pattern is equal to a distance between the two adjacent color resists arranged vertically.

In an embodiment, a material of the light-shielding pattern includes one of copper, aluminum, silver, zinc, a copper-zinc laminate, a copper-titanium laminate, or a copper-aluminum laminate.

In an embodiment, the liquid crystal display panel further includes a planarization layer, the planarization layer is arranged in a region corresponding to the color resists, and the planarization layer is disposed in gaps formed by the light-shielding pattern.

In an embodiment, a material of the planarization layer includes one of silicon nitride, silicon oxide, or silicon oxynitride.

In an embodiment, the first substrate includes a third base, a driving circuit layer, and a color resist layer, two adjacent color resists are overlapping with each other, and the light-shielding pattern is disposed on a side of the third base away from the driving circuit layer.

In an embodiment, the liquid crystal display panel further includes a terminal region, and the light-shielding region is arranged along a direction perpendicular to the terminal region and is positioned in a region opposite to the terminal region.

The present application provides a liquid crystal display panel and a liquid crystal display device. The liquid crystal display panel includes the first substrate, the second substrate, and the liquid crystal layer. The second substrate is disposed opposite to the first substrate. The liquid crystal layer is disposed between the first substrate and the second substrate. The light-shielding layer is disposed on the side of the first substrate away from the liquid crystal layer. The light-shielding layer is patterned to form the light-shielding pattern. The light-shielding pattern is disposed between two adjacent pixels. The difference between the width of the light-shielding pattern and the distance between the two adjacent pixels is less than or equal to the threshold value. The material of the light-shielding pattern includes the inorganic material. In the present application, because of the light-shielding layer disposed on the side of the first substrate away from the liquid crystal layer, the light-shielding pattern disposed between two adjacent pixels, the difference between the width of the light-shielding pattern and the distance between the two adjacent pixels being less than or equal to the threshold value, and the material of the light-shielding pattern including the inorganic material, the light-shielding layer can be disposed outside the substrates of the liquid crystal display panel. Furthermore, by disposing the light-shielding layer between two adjacent pixels, light between the two adjacent pixels can be shielded by the light-shielding layer. This eliminates a need of the black matrix and increases an ability to control liquid crystals. Since the light-shielding layer is disposed outside the substrates of the liquid crystal display panel, stray light is directly shielded at a side of a human eye. Therefore, the width of the light-shielding pattern does not need to be greater than the distance between two adjacent pixels, thereby increasing an aperture ratio of the liquid crystal display panel.

DESCRIPTION OF DRAWINGS

The following describes specific embodiments of the present application in detail with reference to the accompanying drawings, which will make technical solutions and other beneficial effects of the present application obvious.

DETAILED DESCRIPTION OF EMBODIMENTS

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

Embodiments of the present application addresses a technical problem in a current liquid crystal display device that a width of a black matrix is relatively large, which reduces an aperture ratio of the liquid crystal display panel. The embodiments of the present application are configured to solve the technical problem.

Figure 1:
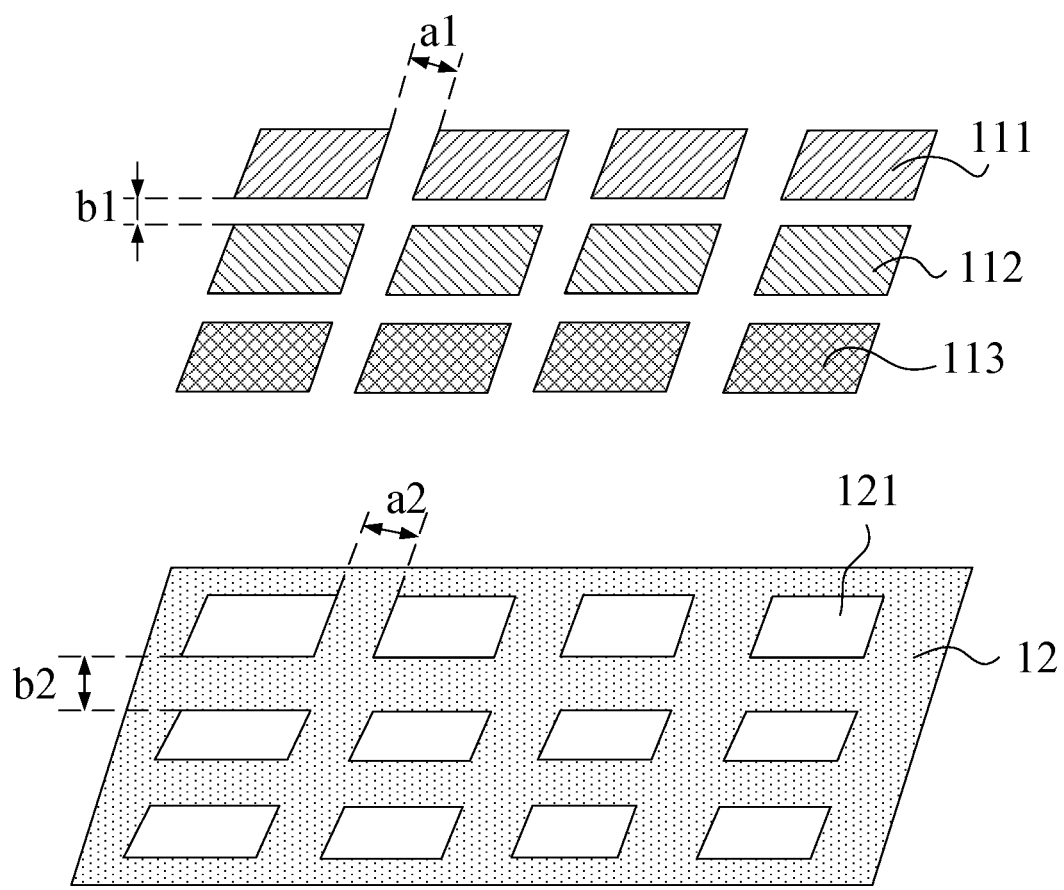
FIG. 1 is a schematic diagram of a color resist layer and a black matrix layer in a current liquid crystal display device.

As shown in FIG. 1, in the current liquid crystal display device, in order to prevent display images from being distorted by stray light between two adjacent pixels, a black matrix is disposed between the two adjacent pixels. A color resist layer includes red color resists 111, blue color resists 112, and green color resists 113. A horizontal distance between two adjacent color resists is a1, and a vertical distance between two adjacent color resists is b1. In order to prevent scattering of the stray light, through holes 121 formed in the black matrix layer 12 is configured to be smaller than a size of the color resists, which means that a horizontal distance a2 between two adjacent through holes 121 is greater than a1, and a vertical distance b2 between two adjacent through holes 121 is greater than a2. This causes the black matrix to shield the color resists and causes an actual light-emitting region to be smaller than a light-emitting region of the color resists, resulting in a reduction in the aperture ratio of the display panel. Therefore, the current liquid crystal display device has a relatively large width of the black matrix, which results in the technical problem that the aperture ratio of the liquid crystal display device is low.

Figure 2:
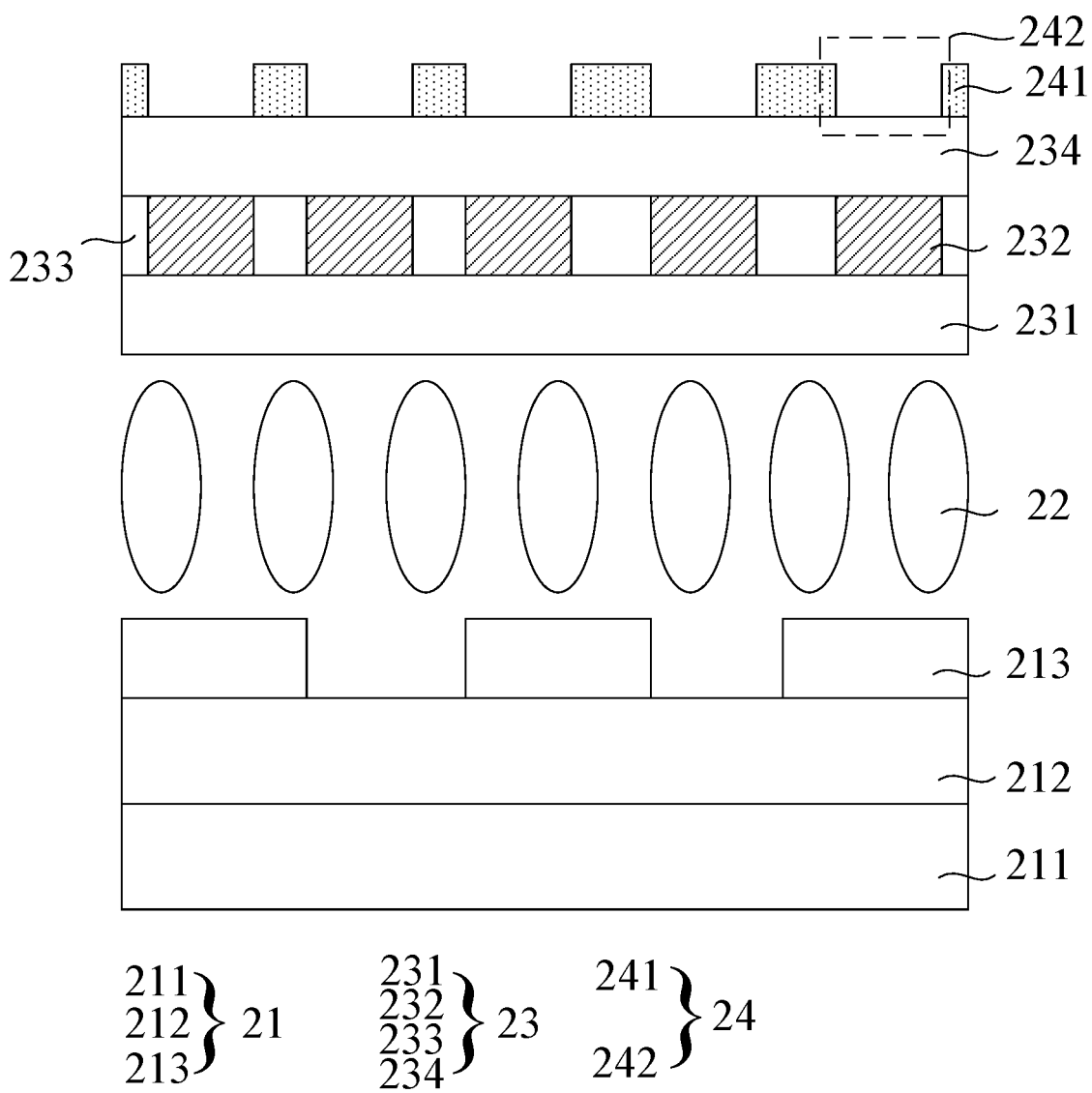
FIG. 2 is a first schematic diagram of a liquid crystal display panel provided by an embodiment of the present application.
Figure 3:
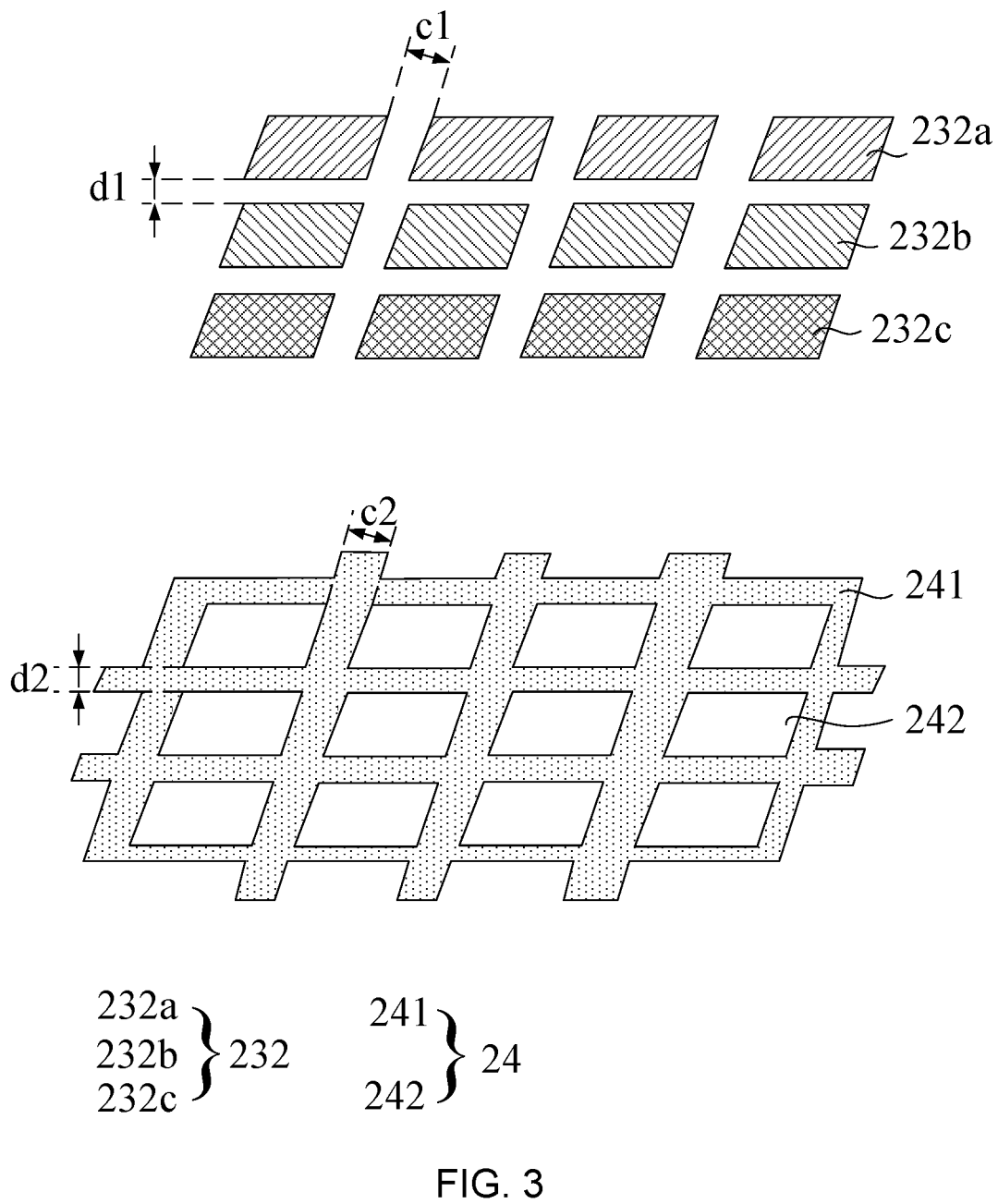
FIG. 3 is a schematic diagram of color resist layer and a light-shielding layer in the liquid crystal display panel provided by an embodiment of the present application.

As shown in FIGS. 2 and 3, an embodiment of the present application provides a liquid crystal display panel. The liquid crystal display panel includes:
- a first substrate 23; and
- a second substrate 21 disposed opposite to the first substrate 23.

A light-shielding layer 24 is disposed on a side of the first substrate 23 away from a liquid crystal layer 22. The light-shielding layer 24 is patterned to form a light-shielding pattern 241. The light-shielding pattern 241 is disposed between two adjacent pixels. A difference between a width c2 (d2) of the light-shielding pattern 241 and a distance c1 (d1) between the two adjacent pixels is less than or equal to a threshold value k. A material of the light-shielding pattern 241 includes an inorganic material.

This embodiment of the present application provides the liquid crystal display panel. Because of the light-shielding layer disposed on the side of the first substrate away from the liquid crystal layer, the light-shielding pattern formed by patterning the light-shielding layer, the light-shielding pattern disposed between two adjacent pixels, the difference between the width of the light-shielding pattern and the distance between the two adjacent pixels being less than or equal to the threshold value, and the material of the light-shielding pattern including the inorganic material, the light-shielding pattern can shield light in a region between two adjacent pixels without providing a black matrix, thereby increasing an ability to control liquid crystals. In addition, since the light-shielding pattern is disposed outside the substrates of the liquid crystal display panel, light at a side of a human eye can be shielded. Therefore, the width of the light-shielding pattern does not need to be greater than the distance between two adjacent pixels, thereby increasing an aperture ratio of the liquid crystal display panel.

It should be explained that in a configuration of the liquid crystal display panel, there will be a situation that a distance between two adjacent pixels in a horizontal direction is different from a distance between two adjacent pixels in a vertical direction, which means that c1 and d1 in FIG. 3 are not equal. Then a comparison between the width of the light-shielding pattern and two adjacent pixels is determined according to a direction of the two adjacent pixels. For example, if the two adjacent pixels are two vertical pixels, the width of the light-shielding pattern is d2, and if the two adjacent pixels are two horizontal pixels, the width of the light-shielding pattern is c2. In this principle, the width of the light-shielding pattern corresponds to the distance between the two adjacent pixels. Meanwhile, there will also be a situation that distances between any two adjacent pixels are not equal. The width of the corresponding light-shielding pattern is determined accordingly, so that the light-shielding pattern shields the light in the region between two adjacent pixels. By determining the width of the light-shielding pattern, the pixels are prevented from being shielded by the light-shielding pattern, and the aperture ratio of the display panel is increased. For a situation that the distance between the two adjacent pixels in the horizontal direction is same as the distance between the two adjacent pixels in the vertical direction, which means that c1 and d1 in FIG. 3 are equal, the width of the light-shielding pattern is a value of any one of c2 or d2.

It should be explained that in FIG. 3, the distance between the two adjacent pixels represents the distance between the two adjacent pixels. In addition, in FIG. 3, the color resists of same color are arranged horizontally, but this embodiment of the present application is not limited to this. The color resists of the same color can be arranged vertically, or the color resists can be arranged in other pixel arrangements.

It should be explained that the threshold value can be a positive vale, zero, or a negative value. In other words, the difference between the width of the light-shielding pattern and the distance between the two adjacent pixels is determined within a certain range.

In prior art, the black matrix is disposed in a substrate, since the black matrix is an organic material, the organic material shrinks during a formation process, which causes the black matrix to be concave in a middle and convex on both sides, liquid crystals have a certain pre-tilt angle (the pretilt angle refers to a deflection angle of the liquid crystals due to a design defect beyond an original design). This causes a display to be affected, such as light leakage, and the liquid crystals cannot be effectively controlled. In this embodiment, compared with the prior art, the black matrix does not need to be provided, so that the liquid crystals can be deflected according to the original design, thereby increasing the ability to control the liquid crystals.

In an embodiment, a first alignment layer is disposed on the first substrate, and a second alignment layer is provided on the second substrate. During forming a liquid crystal cell, alignment layers are formed on the first substrate and the second substrate, so that the liquid crystals are aligned through the alignment layers and are formed with a certain pretilt angle, and then light is controlled by a liquid crystal deflection.

Figure 4:
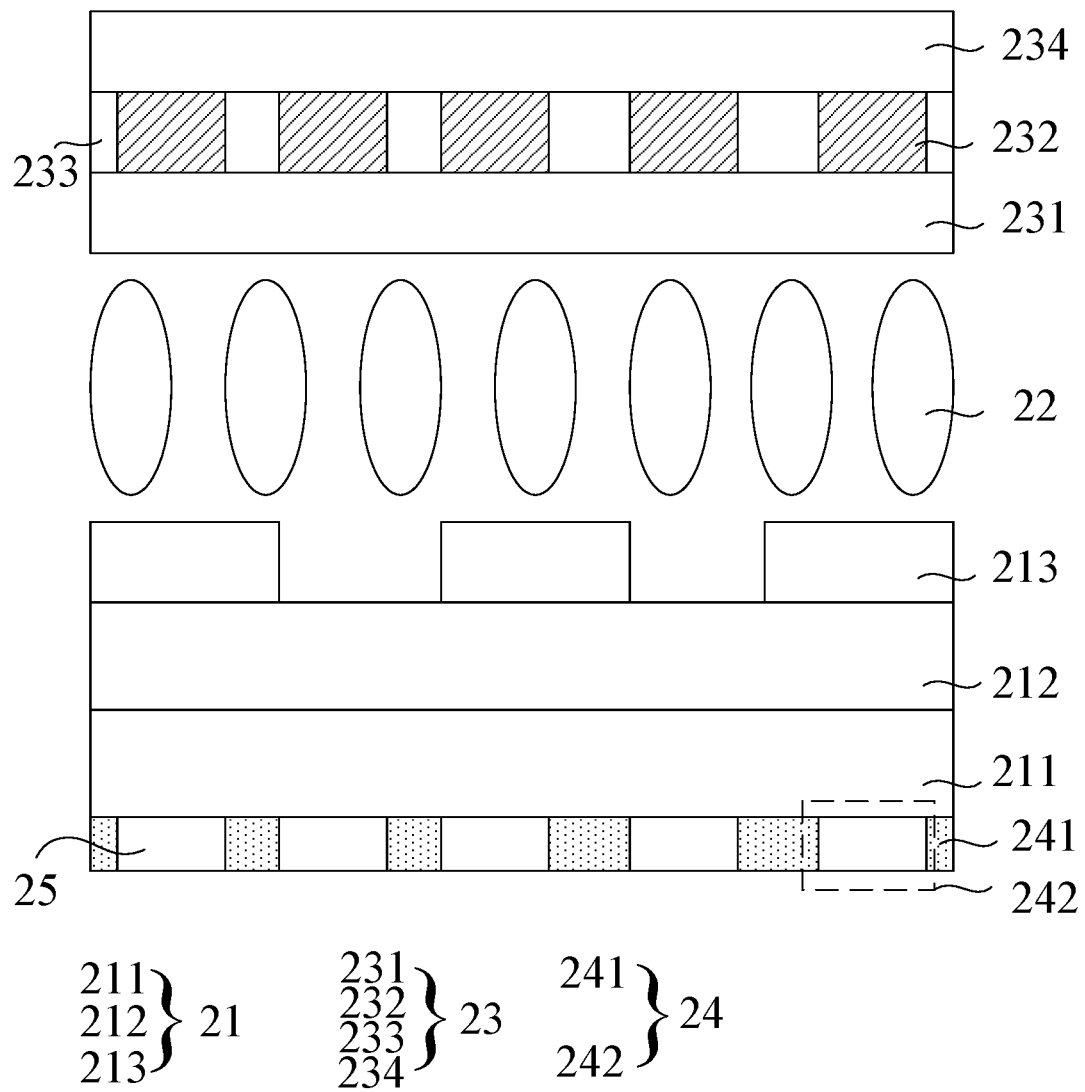
FIG. 4 is a second schematic diagram of a liquid crystal display panel provided by an embodiment of the present application.

In an embodiment, as shown in FIG. 4, the first substrate includes an array substrate 21. The array substrate 21 includes a first base 211, a driving circuit layer 212 disposed on the first base 211, and a pixel electrode layer 213. The light-shielding pattern 241 is disposed on a side of the first base 211 away from the driving circuit layer 212. For a liquid crystal display panel whose light emission direction is at an array substrate side, the light-shielding pattern is disposed on the array substrate side, so that when light is emitted from the array substrate side, the light-shielding pattern shields the light in the region between two adjacent pixels, thereby preventing the display affected by the stray light. Because the light-shielding pattern is disposed at the side of the human eye, after the light is emitted from the array substrate side, the light will not pass through other layers that may cause the light to be refracted or shifted. Therefore, as long as the difference between the width of the light-shielding pattern and the distance between two adjacent pixels is less than the threshold, the stray light can be shielded, thereby increasing the aperture ratio of the liquid crystal display panel.

In an embodiment, as shown in FIG. 2, the first substrate includes a color filter substrate 23. The color filter substrate 23 includes a second base 234, a color resist layer 232 disposed on the second base 234, and a common electrode layer 231. Two adjacent color resists are arranged at intervals. The light-shielding pattern 241 is disposed on a side of the second base 234 away from the color resist layer 232. For a liquid crystal display panel whose light emission direction is at a color filter substrate side, when disposing the light-shielding layer, the light-shielding pattern is disposed on the color filter substrate side, so that the light-shielding pattern shields the light in the region between two adjacent pixels, thereby preventing the display affected by the stray light. Because the light-shielding pattern is disposed at the side of the human eye, after the light is emitted from the color filter substrate side, the light will not pass through other layers that may cause the light to be refracted or shifted. Therefore, there is no need to provide the black matrix, and the stray light can be shielded as long as the difference between the width of the light-shielding pattern and the distance between two adjacent pixels is less than the threshold, thereby increasing the aperture ratio of the liquid crystal display panel.

In an embodiment, the liquid crystal display panel includes a terminal region. The light-shielding pattern is arranged along a direction perpendicular to the terminal region and is positioned in a region opposite to the terminal region. In this way, when disposing the light-shielding pattern, the light-shielding pattern can be arranged horizontally. Therefore, between two adjacent pixels in the vertical direction, by disposing the light-shielding pattern, there is no need to provide the black matrix, thereby increasing the aperture ratio of the display panel.

In an embodiment, the liquid crystal display panel includes a terminal region. The light-shielding pattern is arranged along the terminal region and is positioned in a region opposite to the terminal region. In this way, when disposing the light-shielding pattern, the light-shielding pattern can be arranged vertically. Therefore, between two adjacent pixels in the horizontal direction, by disposing the light-shielding pattern, there is no need to provide the black matrix, thereby increasing the aperture ratio of the display panel.

In an embodiment, as shown in FIG. 3, the light-shielding pattern 241 includes a first pattern arranged horizontally and a second pattern arranged vertically. The width d2 of the first pattern is equal to the distance d1 between two adjacent color resists arranged horizontally. The width c2 of the second pattern is equal to the distance c1 between two adjacent color resists arranged vertically. When determining the width of the light-shielding pattern, the width of the light-shielding pattern is equal to the distance between the two adjacent pixels. Therefore, when the display panel is displaying, regions corresponding to the color resists can be fully displayed. By configuring the light-shielding pattern for shielding, the stray light will not affect the display, thereby increasing the aperture ratio of the display panel.

In an embodiment, when the light-shielding pattern shields the region between the two adjacent color resists, considering a better light-shielding performance, the width of the light-shielding pattern can be greater than the distance between the two adjacent color resists. Since the light-shielding pattern shields the light on the side of the human eye, even if the width of the light-shielding pattern is greater than the distance between the two adjacent color resists, compared with the black matrix shielding the light at the light-emitting side, the width of the light-shielding pattern is less than the width of the black matrix, thereby increasing the aperture ratio of the liquid crystal display panel. When the width of the light-shielding pattern is equal to the distance between the two adjacent color resists, a light-shielding effect of the light-shielding pattern is same as or better than a light-shielding effect of the black matrix. Determining the width of the light-shielding pattern to be greater than the distance between the two adjacent color resists is to take into account that a better light-shielding effect is required, and the width of the light-shielding pattern can be slightly increased, but the aperture ratio of the display panel can still be increased, and a display effect of the display panel can be increased.

In an embodiment, when the light-shielding pattern shields the region between the two adjacent color resists, considering that the width of the light-shielding pattern less than the distance between the two adjacent color resists within a certain range will not be affect the display effect, the width of the light-shielding pattern can be determined to be less than the distance between the two adjacent color resists to further increase the aperture ratio of the display panel. Since the light leaked from the region between the two adjacent color resists does not affect the display effect of the display panel, while the region between the two adjacent color resists of the display panel is shielded, the aperture ratio of the display device is increased.

In an embodiment, a material of the light-shielding pattern includes an inorganic non-metallic material. Specifically, selecting the inorganic non-metallic material with a better light-shielding property as the material of the light-shielding pattern can enhance the light-shielding property of the region between the two adjacent pixels of the liquid crystal display panel.

In an embodiment, the material of the light-shielding pattern includes one of copper, aluminum, silver, zinc, a copper-zinc laminate, a copper-titanium laminate, or a copper-aluminum laminate. By determining the material of the light-shielding pattern to be a metal, an alloy, or a metal laminate, because the metal can reflect and absorb light, the light can be prevented from emission. Moreover, since the material of the light-shielding pattern is the metal, which has ductility, the liquid crystal display panel that needs to be bent or bent does not affect a bending performance of the display panel. Meanwhile, since the metal can discharge static electricity, and the metal is disposed outside the substrates in this embodiment of the present application, the static electricity can be discharged through the metal, thereby enhancing an antistatic ability of the liquid crystal display panel. Due to a better adhesion between the metal and the substrates, when the metal is adopted as the material of the light-shielding pattern, compared with an organic material that has problems of fusion and peeling, the light-shielding pattern adopts the metal will not peel off and break away.

In an embodiment, frictions in a process of handling or moving the liquid crystal display panel causes the static electricity to occur on an outer side of the substrates of the liquid crystal display panel, and when the metal is adopted as the material of the light-shielding pattern, the metal is disposed on an outer side of the substrates, which means that the light-shielding pattern is disposed outside the substrates of the liquid crystal display panel, so as to directly export the static electricity. In this way, the static electricity can be prevented from concentration in the liquid crystal display panel, and the antistatic ability of the liquid crystal display panel can be enhanced.

In an embodiment, the light-shielding pattern is attached to the first base, which means that the light-shielding pattern is disposed on the first base. By configured a thickness of the light-shielding pattern to be thinner, the aperture ratio of the liquid crystal display panel can be increased, and the light-shielding pattern can be prevented from peeling.

In an embodiment, the thickness of the light-shielding pattern ranges from 100 angstroms to 1000 angstroms. By configuring the thickness of the light-shielding pattern to be thinner, a thickness of the liquid crystal display panel can be prevented from being thicker. However, this embodiment of the present application is not limited to this, and a thickness that can shield the region between the two adjacent pixels can be configured as a thickness value of the light-shielding pattern.

In an embodiment, as shown in FIG. 4, the liquid crystal display panel further includes a planarization layer 25. The planarization layer 25 is arranged in a region corresponding to the color resists. The planarization layer 25 is disposed in the gaps 242 formed by the light-shielding pattern 241. When disposing the light-shielding pattern, considering that other layers or other structures will be provided on the light-shielding pattern, the light-shielding pattern needs to be flattened to facilitate configurations of other layers. Therefore, after the light-shielding pattern is designed, considering that there will be certain gaps in the light-shielding pattern, the planarization layer can be disposed in the gaps, so that the planarization layer fills the gaps of the light-shielding pattern, and the light-shielding layer becomes flat.

In an embodiment, the thickness of the light-shielding layer is equal to a thickness of the planarization layer. When disposing the planarization layer, as long as the thickness of the planarization layer is consistent with the thickness of the light-shielding layer, the light-shielding layer becomes flat and facilitates a subsequent formation of film layers.

In an embodiment, the thickness of the planarization layer is greater than the thickness of the light-shielding layer. When forming the planarization layer, the planarization layer is disposed in the gaps of the light-shielding pattern, and the planarization layer is disposed on the light-shielding pattern at a same time. Therefore, after forming the light-shielding pattern, the planarization layer flattens the liquid crystal display panel. When designing other film layers or other structures, a presence of uneven regions that may cause other film layers or other structures to be incompletely formed or be bend, which affects the display, can be prevented.

In an embodiment, a material of the planarization layer includes an inorganic material. Specifically, the material of the planarization layer includes one of silicon nitride, silicon oxide, or silicon oxynitride. When disposing the planarization layer, considering that the planarization layer is disposed in the region corresponding to the color resists, inorganic material is adopted to form the planarization layer, thereby increasing a transparency of the planarization layer.

In an embodiment, the material of the planarization layer includes an inorganic material, and the material of the light-shielding pattern includes one of copper, aluminum, silver, zinc, a copper-zinc laminate, a copper-titanium laminate, or a copper-aluminum laminate. When the inorganic material is adopted to form the planarization layer, considering a poor bending performance of the inorganic material, the metal or the metal laminate is adopted to form the light-shielding pattern, so that the inorganic material is divided. Since the metal has a good ductility, when the liquid crystal display panel needs to be folded or be bent, the metal can prevent the planarization layer from affecting a bending performance of the liquid crystal display panel.

In an embodiment, the material of the planarization layer includes an organic material. In order to enhance the bending performance of the liquid crystal display panel, the material of the planarization layer can be made of the organic material, thereby increasing a flexibility of the planarization layer and the light-shielding layer. Meanwhile, considering that the planarization layer is disposed in the region corresponding to the color resists, a planarization layer with a better light transmittance is required, so that organic materials with better light transmittance can be selected as the material of the planarization layer.

In an embodiment, as shown in FIGS. 2-4, the liquid crystal display panel further includes a color resist planarization layer 233. The color resist planarization layer is disposed between the color resists. When forming the color resist layer, the color resist layer is composed of red color resists 232a, blue color resists 232b, and green color resists 232c, and there is a certain distance between each of the color resists. In this embodiment of the present application, there is no black matrix provided between any two adjacent color resists, so the color resist layer needs to be flat. Therefore, a color resist planarization layer can be disposed between the color resists, which can make the color resist layer flat, and other film layers can be flat in the subsequent formation of the common electrode layer and other film layers.

In an embodiment, a material of the color resist planarization layer is same as a material of the common electrode layer. The common electrode layer is filled in a region adjacent to the color resists. When the color resist layer is planarized, the common electrode layer can be directly filled in the region between the two adjacent color resists to directly form the common electrode layer on the color resist layer. In this way, while flattening the color resist layer, the common electrode layer is also flattened. Meanwhile, as a thickness of the common electrode layer is increased, an impedance of the common electrode layer can be reduced, and the display effect of the liquid crystal display panel can be increased.

In an embodiment, the material of the color resist planarization layer is same as a material of the color resist layer. When forming the color resist planarization layer, the two adjacent color resists may be in contact, and the region between the two adjacent color resists is shielded. Therefore, while the color resists normally emit light, the light-shielding pattern shields the region between the two adjacent color resists, thereby increasing the aperture ratio of the liquid crystal display panel.

In an embodiment, the material of the color resist planarization layer includes an inorganic material. When determining the material of the color resist planarization layer, the inorganic material can also be adopted to form the color resist planarization layer, and the color resist planarization layer can flatten the color resists layer.

In an embodiment, the first substrate includes a third base, a driving circuit layer, and a color resist layer. The two adjacent color resists are overlapping with each other. The light-shielding pattern is disposed on a side of the third base away from the driving circuit layer. In the liquid crystal display panel adopting a color-on-array (color filter disposed on array substrate, COA) substrate, the light-shielding pattern and light-shielding pattern are disposed under the third base to shield the two adjacent pixels, thereby increasing the aperture ratio of the liquid crystal display panel having the COA substrate.

In an embodiment, the first substrate includes a third base, a driving circuit layer, and a color resist layer. The two adjacent color resists are overlapping with each other. The second substrate includes a second base and a common electrode layer disposed on the second base. The light-shielding pattern is disposed on a side of the second base away from the common electrode layer. Considering that the liquid crystal display panel having the COA substrate emits light from a second substrate side, the light-shielding pattern can be provided at an outer side of the second substrate. Since there is no need to provide the black matrix, the aperture ratio of the liquid crystal display panel is increased.

Figure 5:
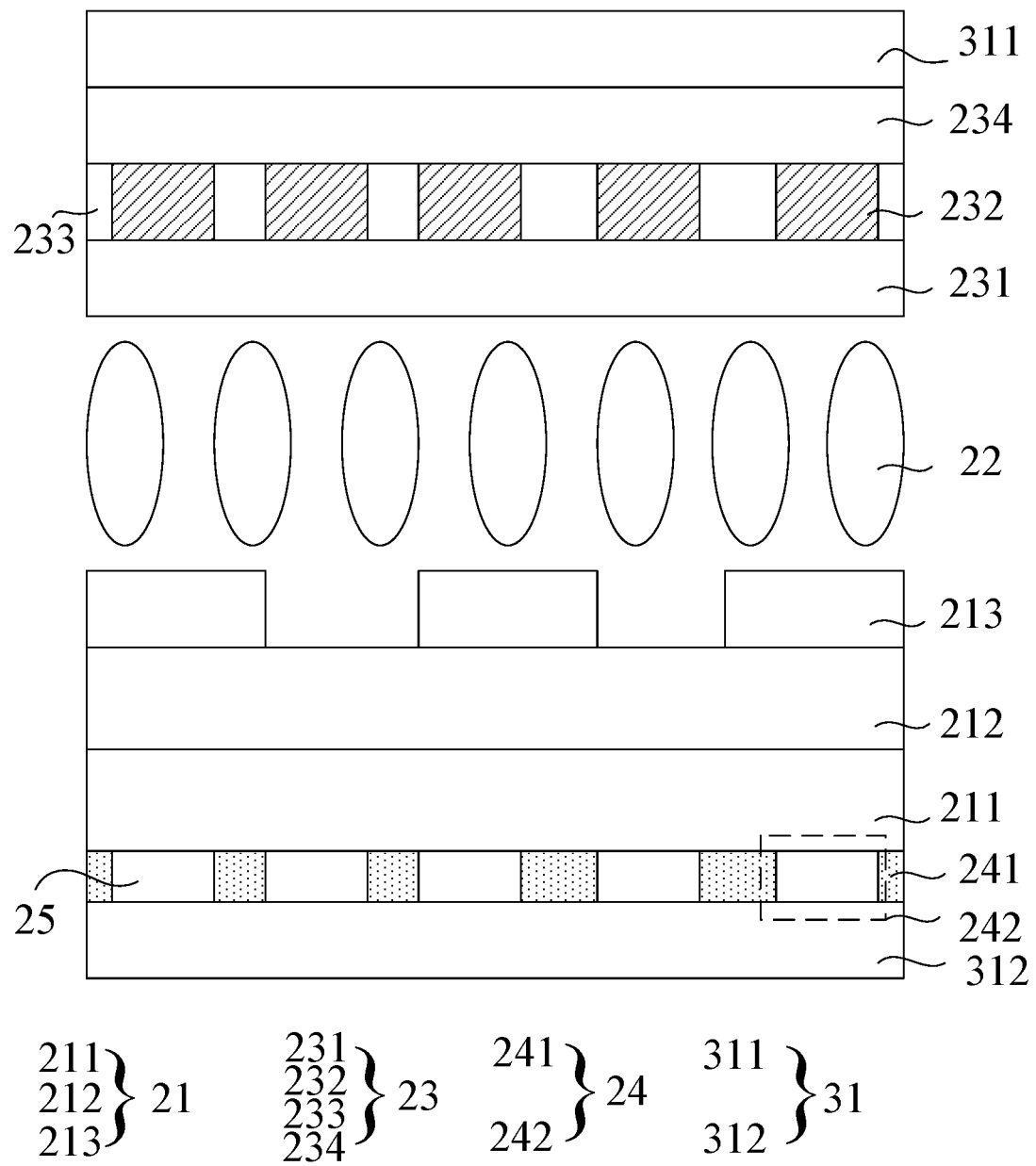
FIG. 5 is a schematic diagram of a liquid crystal display device provided by an embodiment of the present application.

As shown in FIGS. 3 and 5, an embodiment of the present application provides a liquid crystal display device. The liquid crystal display device includes:

a liquid crystal display panel, wherein the liquid crystal display panel includes a first substrate 21, a second substrate 23, and a liquid crystal layer 22, the second substrate 23 is disposed opposite to the first substrate 21, the liquid crystal layer 22 is disposed between the first substrate 21 and the second substrate 23, a light-shielding layer 24 is disposed on a side of the first substrate 21 away from the liquid crystal layer 22, the light-shielding layer 24 is patterned to form a light-shielding pattern 241, the light-shielding pattern 241 is disposed between two adjacent pixels, a difference between a width c2 (d2) of the light-shielding pattern 241 and a distance c1 (d1) between the two adjacent pixels is less than or equal to a threshold value k, and a material of the light-shielding pattern 241 includes an inorganic material; and a polarizer 31 disposed outside the liquid crystal display panel.

This embodiment of the present application provides the liquid crystal display device. The liquid crystal display device includes the liquid crystal display panel and the polarizer. In the display panel, because of the light-shielding layer disposed on the side of the first substrate away from the liquid crystal layer, the light-shielding pattern formed by patterning the light-shielding layer, the light-shielding pattern disposed between two adjacent pixels, the difference between the width of the light-shielding pattern and the distance between the two adjacent pixels being less than or equal to the threshold value, and the material of the light-shielding pattern including the inorganic material, the light-shielding pattern can shield light in a region between two adjacent pixels without providing a black matrix, thereby increasing an ability to control liquid crystals. In addition, since the light-shielding pattern is disposed outside the substrates of the liquid crystal display panel, light at a side of a human eye can be shielded. Therefore, the width of the light-shielding pattern does not need to be greater than the distance between two adjacent pixels, thereby increasing an aperture ratio of the liquid crystal display panel.

In an embodiment, as shown in FIG. 5, the polarizer 31 includes a first polarizer 312 and a second polarizer 311. The first polarizer 312 is disposed on a side adjacent to the first substrate 21. The second polarizer 311 is disposed on a side adjacent to the second substrate 23. At least one light-shielding pattern 241 is disposed between the first polarizer 312 and the first substrate 21 and is disposed between the second polarizer 311 and the second substrate 23. When disposing the light-shielding pattern, the light-shielding pattern is disposed between the liquid crystal display panel and the polarizer, so that after light passes through the liquid crystal display panel, the light-shielding pattern shields the light in a region between the two adjacent pixels. Therefore, there is no need to provide the black matrix, thereby increasing the aperture ratio of the liquid crystal display panel.

In an embodiment, considering that the light is emitted from one side, in the above embodiments, the light-shielding pattern is only disposed on the side where the light is emitted from the liquid crystal display panel. This prevents the light from being shielded and also prevents an increase in a thickness of the liquid crystal display panel. However, in an actual process, when the light-shielding pattern needs to be disposed on both sides of the liquid crystal display panel, the light-shielding pattern can also be formed on the both sides of the liquid crystal display panel.

In an embodiment, the liquid crystal display device further includes a backlight module. The backlight module is disposed on a side of the polarizer away from the liquid crystal display panel. The liquid crystal display device in this embodiment of the present application can be a liquid crystal display device adopting the backlight module, but this embodiment of the present application is not limited to this. For example, mini light-emitting diodes (mini-LEDs) and micro light-emitting diodes (micro-LEDs) can be adopted as a light source to dispose on an array substrate of the liquid crystal display panel, or a light-shielding pattern can be adopted to shield light, thereby increasing the aperture ratio of the liquid crystal display device.

In an embodiment, when forming the light-shielding pattern, the light-shielding pattern can be first formed on a base of the substrates. Therefore, when other film layers are subsequently formed, even if static electricity is generated by frictions, the static electricity can be discharged through the light-shielding pattern. This prevents an accumulation of the static electricity in the liquid crystal display panel and enhanced an antistatic ability of the liquid crystal display panel.

In an embodiment, in the liquid crystal display device, the first substrate includes an array substrate. The array substrate includes a first base and a driving circuit layer disposed on the first base. The light-shielding pattern is disposed on a side of the first base away from the driving circuit layer.

In an embodiment, in the liquid crystal display device, the first substrate includes a color filter substrate. The color filter substrate includes a second base and a color resist layer disposed on the second base. Two adjacent color resists are arranged at intervals. The light-shielding pattern is disposed on a side of the second base away from the color resist layer.

In an embodiment, in the liquid crystal display device, the light-shielding pattern includes a first pattern arranged horizontally and a second pattern arranged vertically. A width of the first pattern is equal to a distance between the two adjacent color resists arranged horizontally. A width of the second pattern is equal to a distance between the two adjacent color resists arranged vertically.

In an embodiment, in the liquid crystal display device, a material of the light-shielding pattern includes one of copper, aluminum, silver, zinc, a copper-zinc laminate, a copper-titanium laminate, or a copper-aluminum laminate.

In an embodiment, in the liquid crystal display device, the liquid crystal display panel further includes a planarization layer. The planarization layer is arranged in a region corresponding to the color resists. The planarization layer is disposed in gaps formed by the light-shielding pattern.

In an embodiment, in the liquid crystal display device, a material of the planarization layer includes one of silicon nitride, silicon oxide, or silicon oxynitride.

In an embodiment, in the liquid crystal display device, the first substrate includes a third base, a driving circuit layer, and a color resist layer. Two adjacent color resists are overlapping with each other. The light-shielding pattern is disposed on a side of the third base away from the driving circuit layer.

In an embodiment, in the liquid crystal display device, the liquid crystal display panel further includes a terminal region. The light-shielding region is arranged along a direction perpendicular to the terminal region and is positioned in a region opposite to the terminal region.

It can be known according to the above embodiments:

The present application provides a liquid crystal display panel and a liquid crystal display device. The liquid crystal display panel includes the first substrate, the second substrate, and the liquid crystal layer. The second substrate is disposed opposite to the first substrate. The liquid crystal layer is disposed between the first substrate and the second substrate. The light-shielding layer is disposed on the side of the first substrate away from the liquid crystal layer. The light-shielding layer is patterned to form the light-shielding pattern. The light-shielding pattern is disposed between two adjacent pixels. The difference between the width of the light-shielding pattern and the distance between the two adjacent pixels is less than or equal to the threshold value. The material of the light-shielding pattern includes the inorganic material. In the present application, because of the light-shielding layer disposed on the side of the first substrate away from the liquid crystal layer, the light-shielding pattern disposed between two adjacent pixels, the difference between the width of the light-shielding pattern and the distance between the two adjacent pixels being less than or equal to the threshold value, and the material of the light-shielding pattern including the inorganic material, the light-shielding layer can be disposed outside the substrates of the liquid crystal display panel. Furthermore, by disposing the light-shielding layer between two adjacent pixels, light between the two adjacent pixels can be shielded by the light-shielding layer. This eliminates a need of the black matrix and increases an ability to control liquid crystals. Since the light-shielding layer is disposed outside the substrates of the liquid crystal display panel, stray light is directly shielded at a side of a human eye. Therefore, the width of the light-shielding pattern does not need to be greater than the distance between two adjacent pixels, thereby increasing an aperture ratio of the liquid crystal display panel.

In the above embodiments, the descriptions of the various embodiments are different in emphases, for contents not described in detail, please refer to related description of other embodiments.

The liquid crystal display panel and the liquid crystal display device provided by embodiments of the present application are described in detail above, and the description of embodiments above is only for helping to understand technical solutions of the present application and its core idea. It should be understood that for a person of ordinary skill in the art can make various modifications of the technical solutions of the embodiments of the present application above. However, it does not depart from the scope of the technical solutions of the embodiments of the present application.

What is claimed is:

1. A liquid crystal display panel, comprising:
a first substrate;
a second substrate disposed opposite to the first substrate; and
a liquid crystal layer disposed between the first substrate and the second substrate;
wherein a light-shielding layer is disposed on a side of the first substrate away from the liquid crystal layer, the light-shielding layer is patterned to form a light-shielding pattern, the light-shielding pattern is disposed between two adjacent pixels, a difference between a width of the light-shielding pattern and a distance between the two adjacent pixels is less than or equal to a threshold value, and a material of the light-shielding pattern comprises an inorganic material, and
the first substrate comprises a base, a driving circuit layer, and a color resist layer, two adjacent color resists are overlapping with each other, and the light-shielding pattern is disposed on a side of the base away from the driving circuit layer.

2. The liquid crystal display panel according to claim 1, wherein the light-shielding pattern comprises a first pattern arranged horizontally and a second pattern arranged vertically, a width of the first pattern is equal to a distance between the two adjacent color resists arranged horizontally, and a width of the second pattern is equal to a distance between the two adjacent color resists arranged vertically.

3. The liquid crystal display panel according to claim 1, wherein a material of the light-shielding pattern comprises one of copper, aluminum, silver, zinc, a copper-zinc laminate, a copper-titanium laminate, or a copper-aluminum laminate.

4. The liquid crystal display panel according to claim further comprising a planarization layer, wherein the planarization layer is arranged in a region corresponding to the color resists, and the planarization layer is disposed in gaps formed by the light-shielding pattern.

5. The liquid crystal display panel according to claim 4, wherein a material of the planarization layer comprises one of silicon nitride, silicon oxide, or silicon oxynitride.

6. The liquid crystal display panel according to claim 1, further comprising a terminal region, wherein the light-shielding region is arranged along a direction perpendicular to the terminal region and is positioned in a region opposite to the terminal region.

7. The liquid crystal display panel according to claim 1, further comprising a terminal region, wherein the light-shielding region is arranged along the terminal region and is positioned in a region opposite to the terminal region.

8. A liquid crystal display device, comprising:
a liquid crystal display panel comprising a first substrate, a second substrate, and a liquid crystal layer, wherein the second substrate is disposed opposite to the first substrate, the liquid crystal layer is disposed between the first substrate and the second substrate, a light-shielding layer is disposed on a side of the first substrate away from the liquid crystal layer, the light-shielding layer is patterned to form a light-shielding pattern, the light-shielding pattern is disposed between two adjacent pixels, a difference between a width of the light-shielding pattern and a distance between the two adjacent pixels is less than or equal to a threshold value, and a material of the light-shielding pattern comprises an inorganic material; and
a polarizer disposed on the liquid crystal display panel, wherein the first substrate comprises a base, a driving circuit layer, and a color resist layer, two adjacent color resists are overlapping with each other, and the light-shielding pattern is disposed on a side of the base away from the driving circuit layer.

9. The liquid crystal display device according to claim 8, wherein the polarizer comprises a first polarizer and a second polarizer, the first polarizer is close to the first substrate, the second polarizer is close to the second substrate, and at least one of the light-shielding pattern is disposed between the first polarizer and the first substrate and is disposed between the second polarizer and the second substrate.

10. The liquid crystal display device according to claim 8, wherein the light-shielding pattern comprises a first pattern arranged horizontally and a second pattern arranged vertically, a width of the first pattern is equal to a distance between the two adjacent color resists arranged horizontally, and a width of the second pattern is equal to a distance between the two adjacent color resists arranged vertically.

11. The liquid crystal display device according to claim 8, wherein a material of the light-shielding pattern comprises one of copper, aluminum, silver, zinc, a copper-zinc laminate, a copper-titanium laminate, or a copper-aluminum laminate.

12. The liquid crystal display device according to claim 8, wherein the liquid crystal display panel further comprises a planarization layer, the planarization layer is arranged in a region corresponding to the color resists, and the planarization layer is disposed in gaps formed by the light-shielding pattern.

13. The liquid crystal display device according to claim 12, wherein a material of the planarization layer comprises one of silicon nitride, silicon oxide, or silicon oxynitride.

14. The liquid crystal display device according to claim 8, wherein the liquid crystal display panel further comprises a terminal region, and the light-shielding region is arranged along a direction perpendicular to the terminal region and is positioned in a region opposite to the terminal region.

* * * * *